(12) United States Patent
Nyako

(10) Patent No.: US 9,526,321 B1
(45) Date of Patent: Dec. 27, 2016

(54) FOREARM MOUNTED HOLSTER FOR QUICK ACCESS TO HANDHELD DEVICE

(71) Applicant: Corey Nyako, San Francisco, CA (US)

(72) Inventor: Corey Nyako, San Francisco, CA (US)

( * ) Notice: Subject to any disclaimer, the term of this patent is extended or adjusted under 35 U.S.C. 154(b) by 0 days.

(21) Appl. No.: 15/194,068

(22) Filed: Jun. 27, 2016

Related U.S. Application Data

(60) Provisional application No. 62/187,441, filed on Jul. 1, 2015.

(51) Int. Cl.
*A45F 5/00* (2006.01)
*A45C 11/00* (2006.01)
*H04B 1/3888* (2015.01)

(52) U.S. Cl.
CPC ............... *A45F 5/004* (2013.01); *A45C 11/00* (2013.01); *H04B 1/3888* (2013.01); *A45C 2011/002* (2013.01); *A45F 2005/008* (2013.01)

(58) Field of Classification Search
CPC .... A45F 5/004; A45F 2005/008; A45C 11/00; A45C 2011/002; H04B 1/3888
USPC ................... 455/575.1, 575.8; 379/437, 440
See application file for complete search history.

(56) References Cited

U.S. PATENT DOCUMENTS

2002/0047028 A1* 4/2002 Harada ..................... A45F 5/00
 224/219
2015/0289615 A1* 10/2015 Welsch ................... G06F 1/163
 224/219

FOREIGN PATENT DOCUMENTS

GB 2402610 A * 12/2004 ............... A45C 1/04

* cited by examiner

*Primary Examiner* — Raymond Dean
(74) *Attorney, Agent, or Firm* — Alexis J Saenz, Esq.

(57) ABSTRACT

A forearm mounted holster for stowing and quick release of a handheld device is disclosed. The holster includes a retractable cord attached to the handheld device. The handheld device may be released from its stowed position by performing a chopping motion of the forearm. The retractable cord may stop the handheld device at the user's hand for quick access to the device.

5 Claims, 4 Drawing Sheets

FOREARM MOUNTED HOLSTER FOR QUICK ACCESS TO HANDHELD DEVICE

CROSS-REFERENCE TO RELATED APPLICATION

This application claims benefit under 35 U.S.C. §119(e) of U.S. Provisional Application having Ser. No. 62/187,441 filed Jul. 1, 2015, which is hereby incorporated by reference herein in its entirety.

FIELD

The subject disclosure relates to holsters for handheld devices.

BACKGROUND

Most people store a handheld device, for example, a mobile phone, in their pants pocket. For those individuals not wearing clothing with a pocket or with pockets too small to hold a device, this presents a problem. The individual may be forced to carry the device around in their hand. Sometimes, the handheld device may be dropped in the process of pulling it out of the pocket and into a useful position. Typically, the process of withdrawing the device from the pocket may be slow, clumsy, and sometimes uncomfortable.

As can be seen, there is a need for a device that can provide storage and quick access to a handheld device.

SUMMARY

In one aspect of the disclosure, a forearm mounted holster for quick release of a handheld device comprises a case configured to stow the handheld device parallel to the forearm and a retractable cord attached to the case and the handheld device. The handheld device is releasable in the direction of a user's hand in response to a chopping motion of the user's forearm. The retractable cord may stop movement of the handheld device at the point of the user's hand.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

Figure 1:
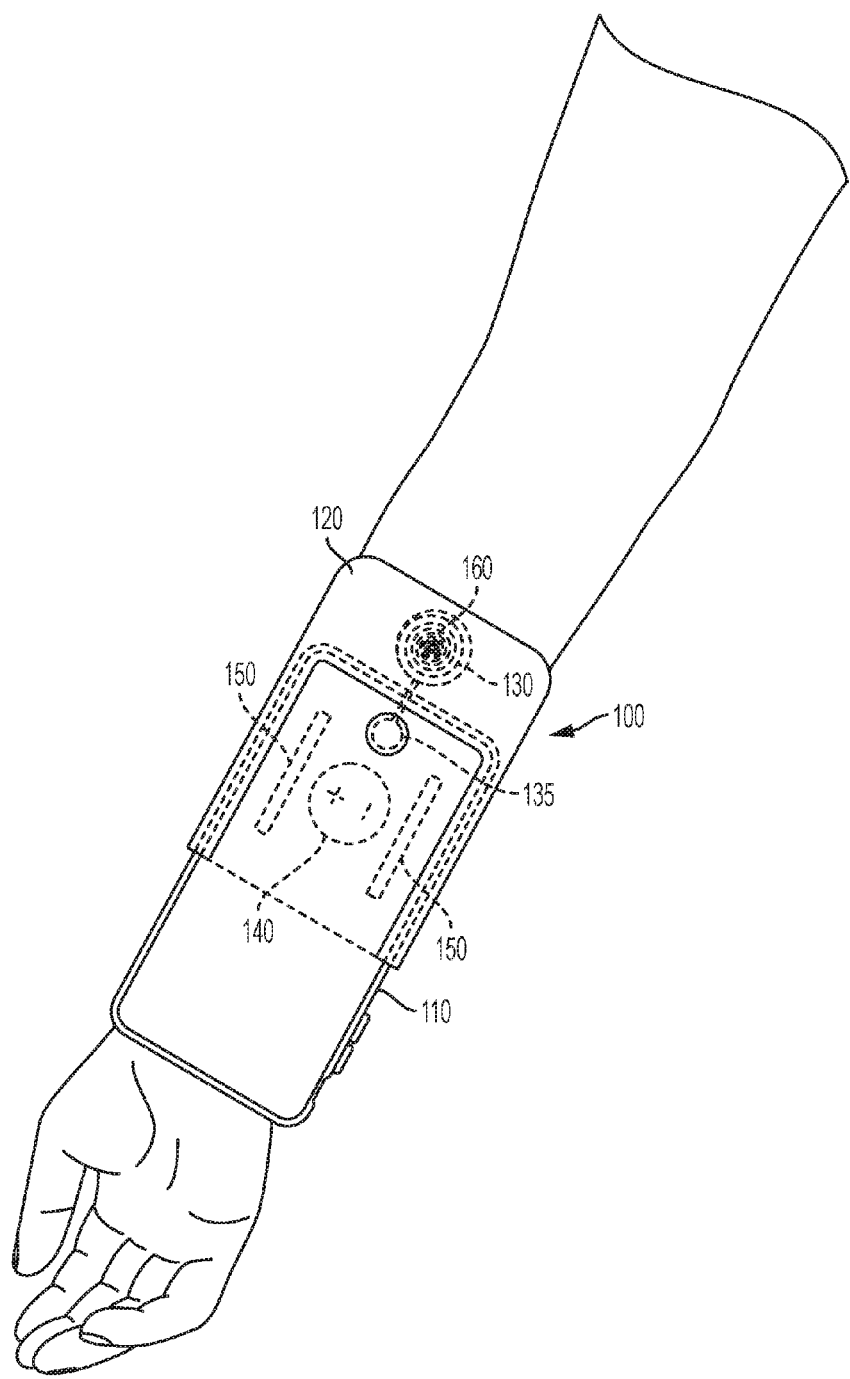
FIG. 1 is a top view of a holster with obstructed elements shown in shadowed lines and a handheld device stowed in the holster in accordance with an aspect of the subject technology.
Figure 2:
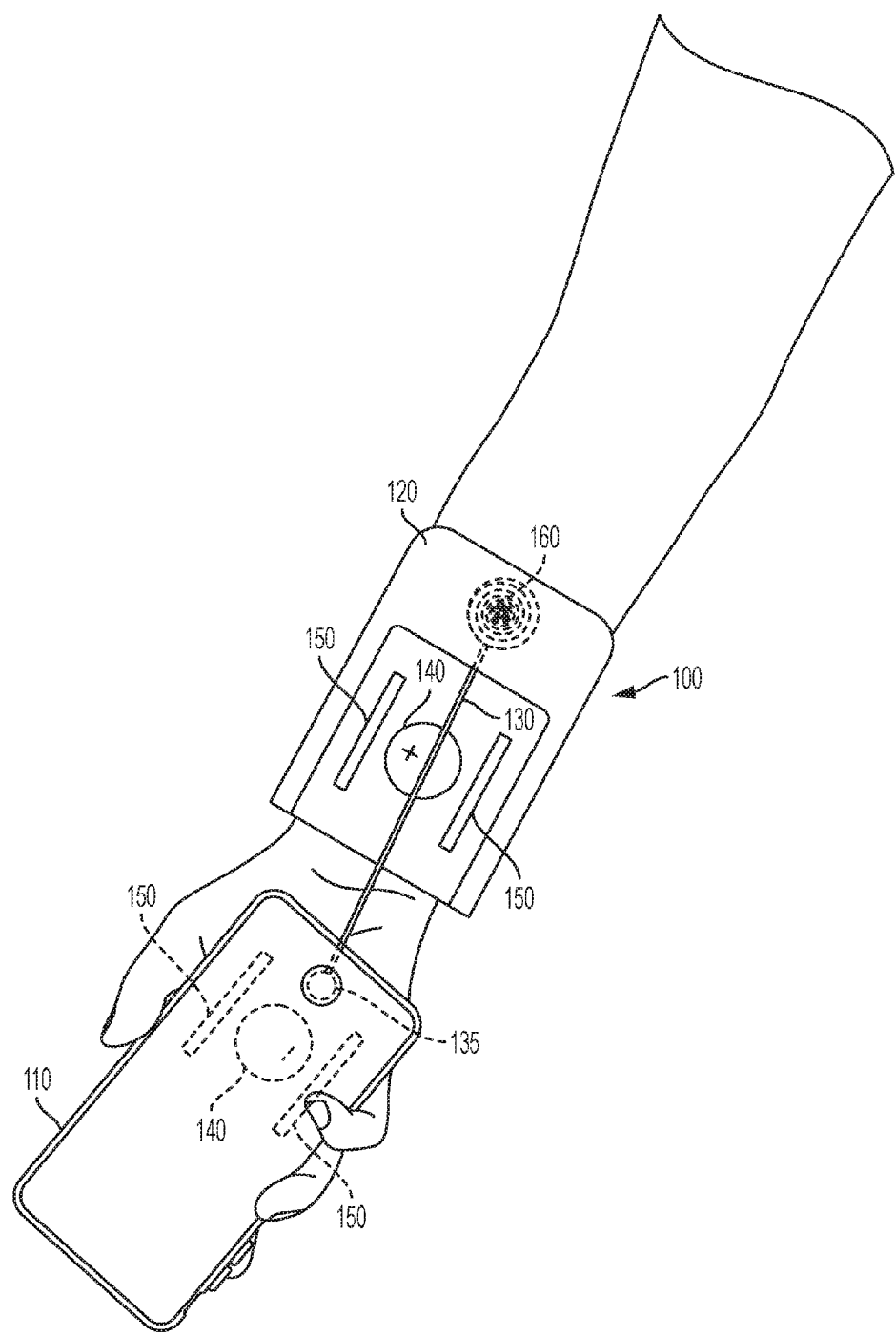
FIG. 2 and FIG. 3 show top views of the holster and handheld device of FIG. 1 in a released position.
Figure 3:
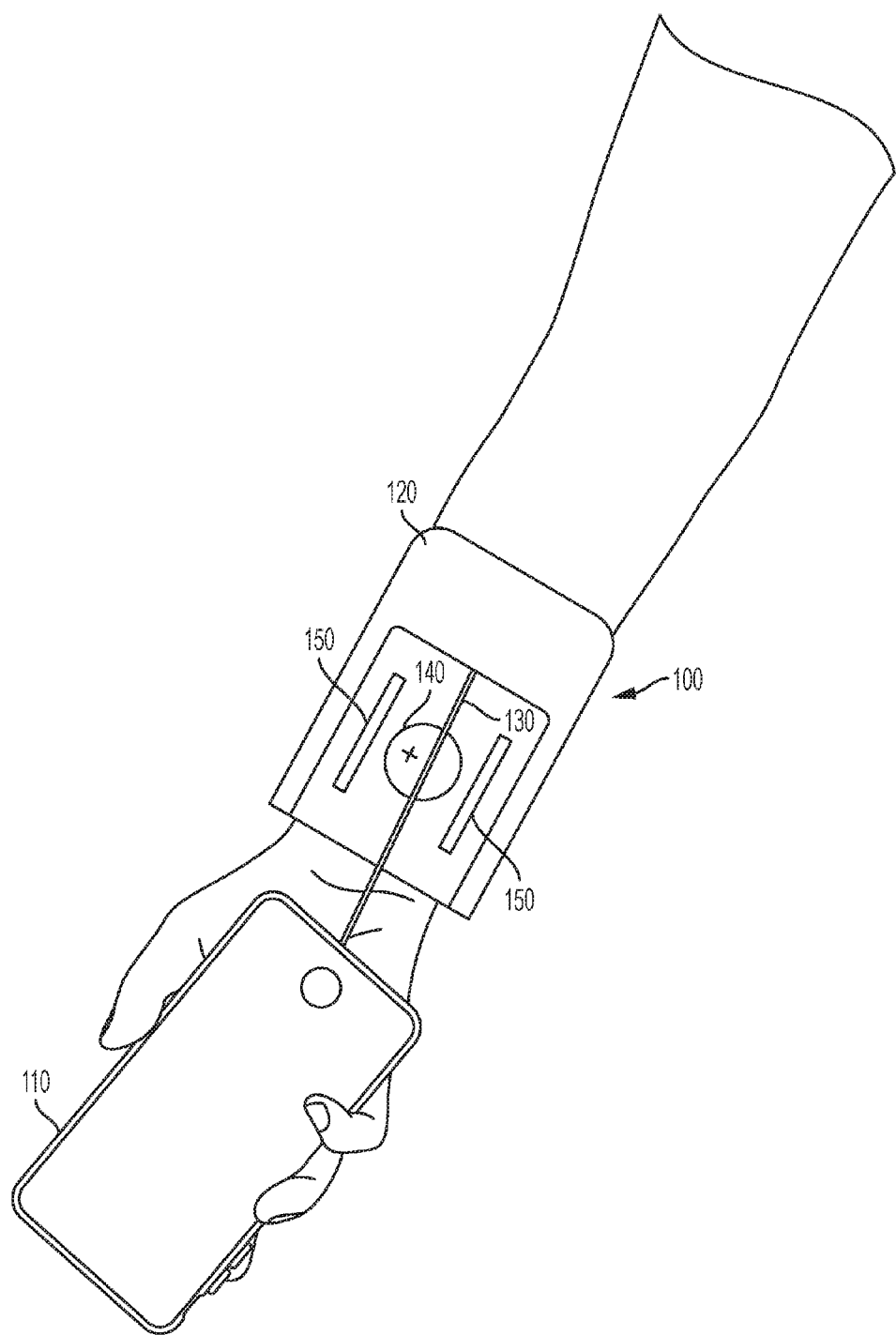
Figure 4:
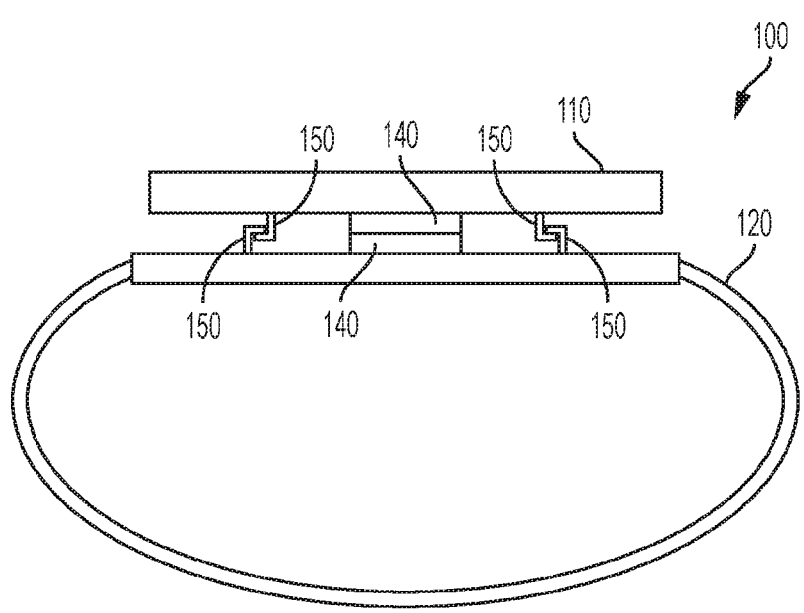
FIG. 4 is an end view of the holster and handheld device of FIG. 1.

Referring to FIGS. 1-4, in general, exemplary embodiments of the subject technology provide a holster 100 for mounting to a person's forearm and holstering a handheld device 110. The handheld device 110 may be for example, a mobile phone, however it will be understood that other devices may be used under the subject technology. The holster 100 may include a case 120 for storing the handheld device 110 when the handheld device 110 is not in use. FIGS. 1 and 2 show elements in shadowed lines on an underside of the handheld device 110 or that are obstructed by the case 120. The case 120 may stow the handheld device 110 parallel to the underside of the forearm. The case 120 may include a retractable cord 130 attached by one end to the handheld device 110. The retractable cord 130 may be attached to the case 120 by a wound spring 160. A second end of the retractable cord 130 may be connected to a spring loaded anchor 135 attached to the handheld device 110. The handheld device 110 may be held in place within the case 120 by a pair of opposite polarity magnets 140 with one magnet 140 being affixed to the case 120 and the other magnet 140 being affixed to an underside of the handheld device 110. When the handheld device 110 is in a stored configuration, the magnets 140 may be aligned one on top of the other. Referring to FIG. 4, (which shows an end view with the upper portion of the case 120 removed for sake of illustration) tracks 150 may be attached to the case 120 and to the underside of the handheld device 110. The tracks 150 may be slots configured to hold edges of the handheld device 110 or may be for example a tongue in groove system coupling the handheld device 110 to the case 120. The handheld device 110 may slide along the tracks 150 when the user accesses the handheld device 110. A strap 170 may secure the holster 100 to the forearm.

The user accesses the handheld device 110 by throwing their arm in a chopping motion to release the handheld device 110 from the holster 100 into their hand (as shown in FIGS. 2 and 3). The force of the chopping motion may overcome the magnetic force of the magnets 140 releasing the handheld device 110 from its stored position. The retractable cord 130 stops the handheld device 110 near the palm of the hand when the motion to release the device 110 from the holster 100 is performed. In some embodiments, the spring 160 may automatically have sufficient tension biasing the handheld device 110 to retract back toward the case 120 when deployed from the case 120. The user may catch the handheld device 110 after performing the chopping motion to prevent automatic retraction into the case 120. When the user no longer needs the handheld device 110 deployed, the user may release their grip on the handheld device 110 and the retractable cord 130 may pull the handheld device 110 back into the case 120. The retractable cord 130 is also used to hold the device 110 in the holster 100. The tracks 150 may guide the handheld device 110 toward the hand when the chopping motion to access the device is performed. In some embodiments, the retractable cord 130 may be lockable so that if the user does not want to inadvertently release the handheld device 110 from the holster 100, the device 110 will remain stowed even if the chopping motion is performed.

Those of skill in the art would appreciate that various components and blocks may be arranged differently (e.g., arranged in a different order, or partitioned in a different way) all without departing from the scope of the subject technology.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Terms such as "top," "bottom," "front," "rear," "above," "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Similarly, an item disposed above another item may be located above or below the other item along a vertical, horizontal or diagonal direction; and an item disposed below another item may be located below or above the other item along a vertical, horizontal or diagonal direction.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A holster for quick release of a handheld device mounted to a user's forearm, comprising:
    a case configured to stow the handheld device parallel to the forearm; and
    a retractable cord attached to the case and attached to the handheld device, the handheld device being releasable in the direction of a user's hand from the case in response to a chopping motion of the user, and the retractable cord being configured to stop movement of the handheld device at the point of the user's hand.

2. The holster of claim 1, further comprising a first magnet attached to the case and positioned to align with a second magnet attached to a surface of the handheld device when the handheld device is stowed in the case.

3. The holster of claim 1, further comprising a wound spring coupled to the case and attached to the retractable cord, wherein the wound spring is biased to draw the handheld device back to the case when the handheld device is released from a stowed state.

4. The holster of claim 3, wherein the case further comprises tracks holding the handheld device wherein the handheld device is slidable along the tracks and the tracks are configured to guide the handheld device into a stowed position within the case.

5. The holster of claim 3, wherein the wound spring is tensioned so that the deployment of the handheld device from the case positions the handheld device proximate a palm of the user's hand.

\* \* \* \* \*